Jan. 3, 1956  S. B. COHN  2,729,794
HIGH FREQUENCY APPARATUS
Filed Oct. 20, 1950  2 Sheets-Sheet 1
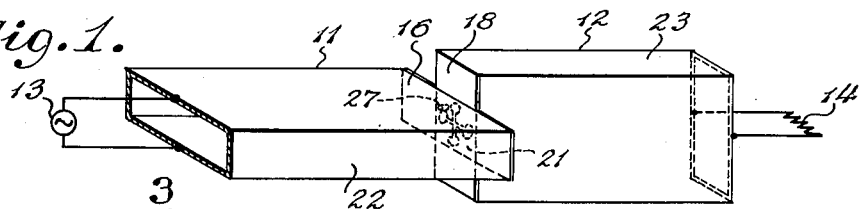
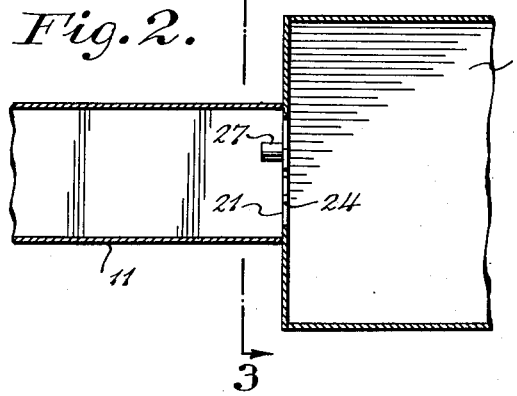
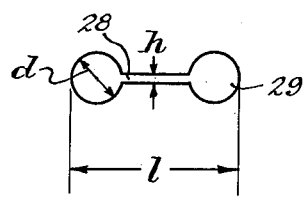
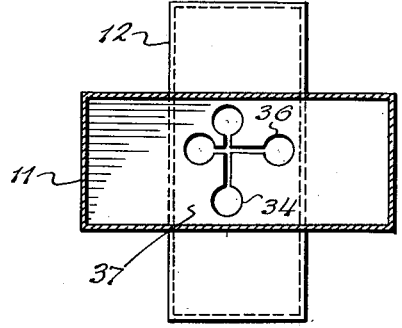
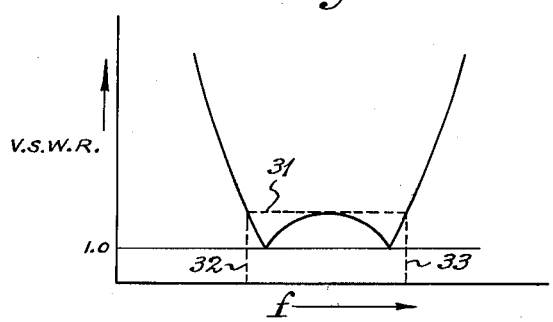
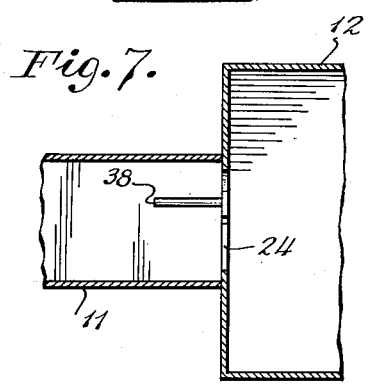
INVENTOR
SEYMOUR B. COHN
BY
Paul B. Hunter
ATTORNEY Jan. 3, 1956  S. B. COHN  2,729,794
HIGH FREQUENCY APPARATUS
Filed Oct. 20, 1950  2 Sheets-Sheet 2
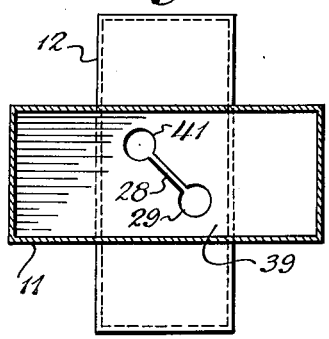
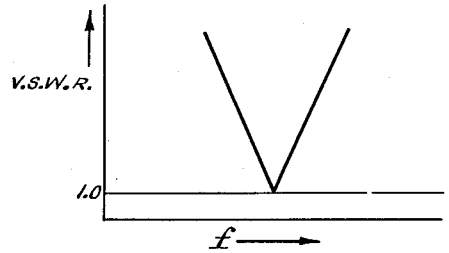
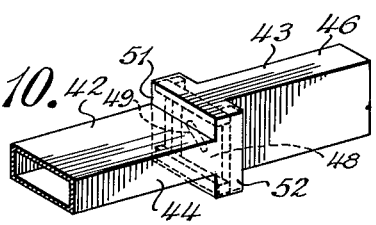
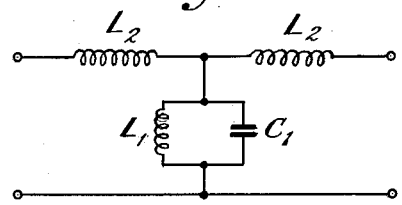
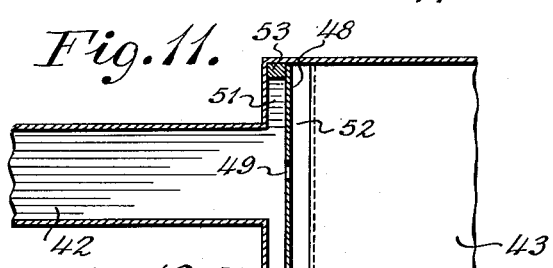
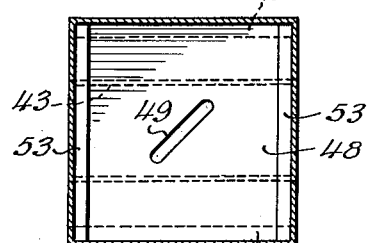
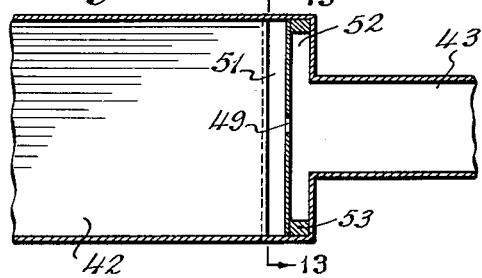
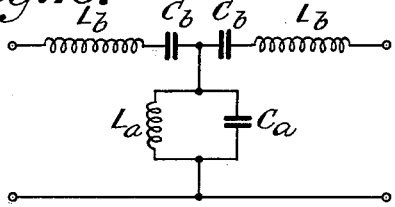
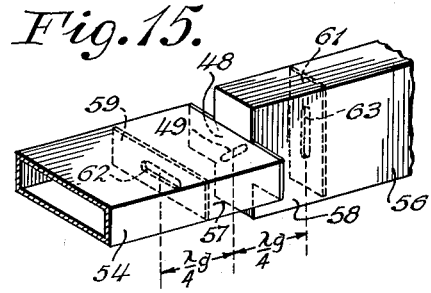
INVENTOR
SEYMOUR B. COHN
BY
Paul B. Hunter
ATTORNEY

United States Patent Office 2,729,794
Patented Jan. 3, 1956

2,729,794

HIGH FREQUENCY APPARATUS

Seymour B. Cohn, Flushing, N. Y., assignor to Sperry Rand Corporation, a corporation of Delaware Application October 20, 1950, Serial No. 191,118

8 Claims. (Cl. 333—21)

This invention relates to wave-energy coupling devices and more particularly, to apparatus for changing the polarization of wave-energy in an electromagnetic energy conducting system.

In an ultra-high-frequency transmission system, it is often necessary to change the polarization of electromagnetic energy which is conveyed by the system. In the past, where it became necessary to convert one transverse electric polarization to another transverse electric polarization, a twisted rectangular waveguide or circular waveguide containing a twisted strip of conductive material was employed. In order to minimize the reflection of electromagnetic energy and standing waves in the transmission system, such structures inherently require a long twisted section, of the order of several wavelengths at the operating frequency. Such twisted sections are objectionable in many installations owing to space limitations. In addition, such sections are expensive to manufacture.

Another method of rotating the plane of polarization is taught in Patent No. 2,668,191 by Seymour B. Cohn.

In accordance with one form of the instant invention, two aligned electromagnetic energy conductors or waveguides, which are disposed at an angle relative to one another, are arranged with their opposed ends substantially abutting. Intermediate the opposed ends, a partition including a resonant aperture is positioned. By reason of this arrangement electromagnetic energy may be coupled between the waveguides with a negligible reflection of electromagnetic energy over a substantial range of frequencies. In addition, the structural arrangement, which is effective for achieving a rotation of the transverse electric polarization of energy transmitted through the waveguides does not involve any physical twisting or structural distortion of the wave guides. Moreover, such structural arrangement is characterized by an extremely small axial dimension.

Accordingly, it is an object of the present invention to provide an improved wave-energy polarization converter.

Another object of this invention is to provide for the efficient coupling of electromagnetic energy between two high-frequency conductors positioned at an angle with respect to one another.

A further object of the present invention is to provide a wave-energy polarization converter which is extremely compact and relatively inexpensive to manufacture.

Another object of the present invention lies in the provision of an efficient wave-energy polarization converter having broadband characteristics.

Other objects and advantages will become apparent from the specification, taken in connection with the accompanying drawings, wherein the invention is embodied in concrete form.

Fig. 1 is a perspective, partially schematic view of the preferred form of the instant invention.

Fig. 2 is an elevational view, mainly in cross-section, of the device of Fig. 1.

Fig. 3 is a cross-sectional view of the device of Fig. 2 taken along lines 3—3 thereof.

Fig. 4 is a schematic representation of a part of the structure of Fig. 3.

Fig. 5 is a graphical representation, useful for explaining the principles of the present invention.

Fig. 6 is a cross-sectional view showing a modification of the device of Fig. 2 taken along lines 3—3 thereof.

Fig. 7 is a view, mainly in cross-section, of a modification of the device of Fig. 2.

Fig. 8 is a cross-sectional view of a further modification of the device of Fig. 2.

Fig. 9 is a graphical representation useful for explaining the principles of the present invention.

Fig. 10 is a perspective, partially schematic view of a further embodiment of the present invention.

Figs. 11 and 12 are cross-sectional longitudinal views of the device of Fig. 10 taken at right angles to one another.

Fig. 13 is a cross-sectional view taken along lines 13—13 of the device of Fig. 12.

Fig. 14 illustrates an equivalent circuit of the device of Fig. 10.

Fig. 15 is a perspective, partially schematic view of a further embodiment of the present invention.

Fig. 16 illustrates an equivalent circuit of the device of Fig. 15.

Similar characters of reference are employed in all of the above figures to indicate corresponding parts.

Referring to Fig. 1, an electromagnetic energy conducting means, which may include rectangular waveguides 11, 12, is provided with a source 13 and load 14 coupled to waveguides 11, 12, respectively, which are dimensioned to propagate electromagnetic energy in the dominant or TE$_{10}$ mode. The waveguides 11 and 12 may be disposed with their axes substantially aligned and positioned at an angle relative to one another. More specifically, the narrow or side walls 22 of waveguide 11 are arranged at an angle relative to the narrow or side wall 23 of waveguide 12. By employing geometrical considerations, it may be said that the plane of the side wall 22 of waveguide 11 intersects the plane of the side wall 23 of waveguide 12 and, more particularly, these planes are substantially perpendicularly disposed. It will also be noted that there is provided a rectangular waveguide means having a first portion, such as waveguide 11, and a second portion, such as waveguide 12, with the first portion being twisted or rotated with respect to the second portion.

In addition, the waveguides 11, 12 may be provided with end walls 16, 18 having a common portion or partition 21. Viewed somewhat differently, it will be noted that the opposed ends of the waveguides 11, 12 are substantially abutting with a partition 21 disposed therebetween.

As shown more clearly in Fig. 3 the partition 21 may be formed with a resonant aperture, having a generally symmetrical configuration. The aperture is constituted of two crossed dumbbell-shaped resonant apertures 24, 26, which are arranged symmetrically with respect to each other and are symmetrically disposed relative to the axes of waveguides 11, 12. The axis of the dumbbell-shaped aperture 24 is positioned substantially parallel to the side wall 22 of waveguide 11 and the axis of the dumbbell-shaped aperture 26 has its axis positioned substantially parallel to the side wall 23 of waveguide 12. Thus, the axes of the apertures 24, 26 may be substantially mutually perpendicular and intersect at a point along the axes of the waveguides 11, 12.

The apertures 24, 26 may be designed to be resonant at a given frequency in the vicinity of the desired pass band, in which case both of the apertures 24, 26 may be provided with substantially the same dimensions. Of course, it will be appreciated that the resonant frequency of the apertures 24, 26 may be slightly different.

In order to produce a perturbation in the symmetry of the coupling means, such as partition 21, which may include the apertures 24, 26, a probe 27 may be arranged to project from the partition 21 in a direction parallel to the axes of the waveguides 11, 12.

As shown more clearly in Fig. 4, each of the apertures 24, 26 is provided with a slit or slot portion 28, which slot portion 28 has enlarged portions or openings 29 at the ends thereof. With a dumbbell configuration for the apertures 24, 26, it is possible to attain transmission at any desired frequency in the useful waveguide frequency range. With regard to apertures 24, 26 (Fig. 4) the slot portion 28 by being formed with a relatively small width is effective for providing a relatively large magnitude of capacitance. This arrangement permits the attainment of a lower resonant frequency for the apertures 24, 26 for a given length 1 thereof. It will be noted that a suitable length 1 for apertures 24, 26 is required in terms of the dimensions of the partition 21 and the desired electrical characteristics.

The partition 21 is preferably made as thin as possible, that is, with an extremely small dimension extending in the direction of the axes of the waveguides 11, 12 in view of electrical considerations. Stated somewhat differently, the thickness or axial extent of the partition 21 should preferably be a very small fraction of the principal dimension or length 1 of the apertures 24, 26. The thinner the partition 21, the greater the band width that is obtainable. Similar considerations apply to the other devices described hereinbelow.

In order to insure the efficient coupling of electromagnetic energy through the waveguides 11, 12 these parts as well as the end probe 27 and walls 16, 18 including partition 21 are preferably formed of a highly conductive material. This may be accomplished for instance by fabricating these parts of copper, silver or a substance plated with such materials. Similar considerations apply to the other devices described hereinbelow.

In operation, an electromagnetic energy wave introduced by means of source 13 into waveguide 11, which may be dimensioned to transmit the dominant or $TE_{10}$ mode of electromagnetic energy, has its electric vector extending parallel to the side wall 22 of waveguide 11. Each of the resonant apertures 24, 26 included in partition 21, upon which the electromagnetic energy conveyed in waveguide 11 impinges, have a distributed inductance and a distributed capacitance which is effective for achieving a resonant condition. It may be said that resonant aperture 24 is coupled only to waveguide 12 and that resonant aperture 26 is coupled only to waveguide 11.

In order to couple the apertures 24, 26 to one another, so that electromagnetic energy may be excited or launched in waveguide 12, a perturbation in the symmetry of the apertures 24, 26 or partition 21 is provided in form of probe 27. By reason of such perturbation of symmetry, the partition 21 including the apertures 24, 26 are effective for efficiently conducting electromagnetic energy with a negligible reflection over a substantially wide range of frequencies.

A graphical representation, as shown in Fig. 5, indicates the theoretical operating characteristics of the device of Fig. 1. It will be noted that the curve indicates an overcoupled condition. The equivalent circuit of the device of Fig. 1 may be represented by two parallel resonant circuits, which are coupled by means of their respective inductances. By varying the degree of coupling between the apertures 24, 26, it is possible to achieve an approximately overcoupled, undercoupled, or critically coupled condition.

Thus, it will be noted that the partition 21, including the apertures 24, 26, constitutes a means for converting the polarization of electromagnetic energy or a means for altering the direction of electric vector of electromagnetic energy transmitted in the electromagnetic energy conducting means, such as waveguides 11, 12. Viewed somewhat differently, the partition 21 and apertures 24, 26 constitute, in connection with electromagnetic energy conductors, such as waveguides 11, 12 disposed at an angle relative to one another, a means for efficiently coupling electromagnetic energy intermediate the waveguides 11, 12. It will also be noted that, as shown for example in Fig. 1, while the waveguides 11, 12, may be aligned along an axis, one of the waveguides, such as waveguide 11, may be disposed at an angle relative to the other of the waveguides, such as waveguide 12.

Referring again to Fig. 4, with each aperture 24, 26 having $h=0.88$, $d=0.375$ and $l=1.250$, all in inches, and with the waveguides, such as waveguides 11, 12, having internal dimensions of 2.840 x 1.340 inches, the approximately overcoupled variety may be obtained with a band width of the order of 125 megacycles per second centered at 3640 megacycles per second and a maximum voltage standing wave ratio of 1.12. The configuration of Figs. 1–3 is assumed, in which the waveguides 11, 12 are axially aligned with their respective side walls 22, 23 perpendicularly disposed with respect to each other, and the dumbbell apertures 24, 26 are oriented symmetrically at right angles to each other and with the axis of each parallel to a broad side of waveguides 11, 12. The manner of determining this data is indicated in Fig. 5 wherein the dotted line 31 represents the peak amplitude of the voltage standing wave ratio occurring in the pass band, that is, between the dotted lines 32, 33, which indicate the band width. In connection with the foregoing, it may be additionally pointed out that the probe 27, having a diameter of 0.218 inch and a length of 0.250 inch, was located 7/32 inch above the axis of the resonant aperture 26 and the same distance to the left of the axis of aperture 24. It will be understood that the foregoing numerical example is included by way of illustration and is not to be construed in a limiting sense.

If desired, in connection with the device of Fig. 1 a perturbation in the symmetry of the coupling apertures 24, 26 may be achieved by employing an additional aperture in partition 21 in substitution for the probe 27.

While the apertures 24, 26 have been shown as crossing one another, it will be understood that they may be disposed in partition 21 in such manner that they are spaced from one another, that is, apertures 24, 26 need not cross. However, in order to achieve a suitable length 1 for the apertures 24, 26, as previously discussed, and in view of space limitations in connection with the partition 21, it is generally convenient to employ a crossed configuration for the apertures 24, 26.

It will also be noted that the end walls 16, 18 including the common wall portion partition 21 may be fabricated as a unit and merely employed with waveguides having the construction of waveguides 11 and 12. In this connection all that is needed is a suitable means for joining such an integral member 16, 18, 21 to the waveguides 11, 12. Thus, the integral member 16, 18, 21 may be manufactured independently of waveguides 11, 12.

Referring to Fig. 6 there is shown a modification of the device of Fig. 1 and particularly discloses an arrangement for producing a perturbation in the resonant apertures 34, 36, which may have the same configurations as the apertures 24, 26 of Fig. 3. However, while the axes of the apertures 34, 36 are perpendicularly arranged relative to one another, the apertures 34, 36 are positioned to cross or intersect in a point displaced from the axes of the waveguides 11, 12. However, it will be noted that the point of intersection of the apertures 34, 36 lies substantially on a diagonal line of the partition 37. It will be readily apparent that other arrangements may be employed in connection with apertures, such as apertures 34, 36, in order to achieve the desired perturbation in symmetry. The operation of the device of Fig. 6 is similar to the device of Fig. 1.

In order to increase the range of frequencies over which a negligible reflection of electromagnetic energy occurs, the probe 27 of Fig. 2 may be replaced by a resonant probe 38. Both the length and the diameter of the probe 38 may be selected in order to obtain a resonant frequency therefor occurring in the vicinity of the desired pass band. By such an arrangement a triple resonant response curve of voltage standing wave ratio to frequency may be obtained. Such a curve will have three spaced points at which the voltage standing wave ratio has a value of unity in contrast to the two spaced points shown in the curve of Fig. 5. More particularly, such a curve will have two peaks occurring in the pass band in contrast to the single peak shown in Fig. 5. While the resonant frequency of the probe 38 may be the same as that of the apertures 24, 26, it will be understood that the resonant frequencies may be slightly different.

It will be further apparent that the resonant probe 38 need not have the precise configuration shown in Fig. 1. For example, probe 38 may have other than a circular cross-section, may be provided with a rounded end, or may have its free end formed with a knob or ball.

In connection with any of the foregoing devices, it will be understood that if desired, the axes of the waveguides 11, 12 may be arranged to intersect at an angle in the vicinity of the partition 21. In other words, the waveguides 11, 12 need not be aligned along a common axis. However, at the same time it will be appreciated that an important feature of the device of Fig. 1 is that the waveguides 11, 12 may be arranged along a common axis so that the structure has a colinear configuration. Thus, the device may be readily employed in place of a twisted section, in transmission systems, without the necessity of using a relatively large length, which is characteristic of such sections.

In addition, while waveguide 12 has been shown rotated 90 degrees with respect to waveguide 11, that is, with the plane of the narrow sides 22 of waveguide 11 perpendicularly disposed relative to the plane of narrow wall 23 of waveguide 12 the waveguides 11, 12 may be positioned at other angles relative to each other by suitably arranging the apertures 24, 26. In such case, efficient transmission of electromagnetic energy between the waveguides 11, 12 so oriented may be achieved. Under such circumstances, the axes of the apertures, such as apertures 24, 26, may be other than perpendicularly arranged. Furthermore, with such an arrangement, the desired perturbation of symmetry may be inherently provided.

In addition, while both waveguides 11, 12 have been shown as having the same dimensions, it will be understood that the coupling means, including partition 21, may be employed in connection with waveguides of different sizes. All of the foregoing possible modifications apply to the other devices described herein.

As shown in Figs. 1–3 the end walls 16, 18 as well as the partition 21 are formed of an integral structure. It will be understood that each of the guides 11, 12 may be provided with separate end walls having a common portion, such as portion 19 in which resonant apertures 24, 26 are included.

Referring to Fig. 8, a further modification of the device of Fig. 1 is shown, including a partition 39 having a resonant aperture 41. The aperture 41, which may, for instance, have the same general configuration as apertures 24, 26, has its axis aligned with one of the diagonal lines of the square-shaped partition 39. In other words, the principal dimension of the aperture 41 extends at a 45° angle with respect to the side wall 22 of waveguide 11 and the side wall 23 of waveguide 12. In addition, the aperture 41 is symmetrically disposed with respect to a line passing through the center of the axes of the waveguides 11, 12 and perpendicularly disposed with respect to its own axis.

The operation of the device of Fig. 8 is similar to that hereinabove discussed in connection with the device of Fig. 1. However, while each of the apertures 24, 26 are effective for coupling to only one of the waveguides 11, 12 resonant aperture 41 couples equally to both waveguides 11, 12. The device of Fig. 8 is effective for providing a minimum reflection of electromagnetic energy over a much narrower band of frequencies than, for instance, the device of Fig. 1, as will be appreciated by reference to the theoretical voltage standing wave ratio versus frequency characteristic shown in Fig. 9.

Similarly to the previously discussed devices, the two waveguides 11, 12 need not be arranged substantially at 90° with respect to one another. It is preferable to arrange the axis of an aperture, such as aperture 39, to bisect the angle between the two guides, such as waveguides 11, 12. By following this procedure, it will be apparent that the device shown in Fig. 8 may be employed to couple electromagnetic energy between waveguides positioned at a variety of angles with respect to one another, thereby achieving various degrees of a twist in the transverse electric polarization.

The resonant aperture 39 need not have the precise configuration shown, but may take a variety of forms. For instance, the enlarged portions or openings 29 may be omitted so that the aperture 41 takes on the shape of a slot. In this connection it will be noted that the portion 28 of the aperture 41 has the configuration of a slot. If desired, two closely-spaced slots may be employed each having their axes extending in a direction to bisect the angle formed between two waveguides, such as waveguides 11, 12. If desired, the aperture 41 may be formed with an H configuration with the horizontal bar of the letter corresponding to the slot 28 of the aperture 41. Accordingly, it will be noted that the precise configuration of the aperture 41 may vary considerably. Similar considerations apply to the previously-discussed apertures, such as for example, apertures 24, 26.

Referring to Fig. 10, a further modification of the device of Fig. 1 is shown, wherein the waveguides 42, 43 are substantially aligned along an axis and are disposed at a 90° angle relative to one another. Intermediate the opposed ends of waveguides 42, 43 is positioned a diaphragm or partition 48 which includes a resonant aperture 49. Aperture 49 may have the same configuration as aperture 41 of Fig. 8. Means are provided for introducing series inductance in each of the waveguides 42, 43 in the vicinity of the partition 48. This may take the form of providing an expanded wall portion 51, 52 in the broad walls of the waveguides 42, 43 at their abutting ends. The cavities 51, 52 are provided with a height which is greater than the narrow dimensions of the waveguides 42, 43 but preferably smaller than the broad dimensions of the waveguides. This is accomplished by the use of metallic bars 53.

The operation of the device of Figs. 10–13 is substantially similar to that previously described in connection with the device of Fig. 8, inasmuch as the resonant aperture 49, shown most clearly in Fig. 13, has its axis extending to bisect the angle between the waveguides 42, 43. However, the inductive cavities 51, 52 are effective for introducing series inductance, as shown most clearly in the equivalent circuit of Fig. 14, so that a device results having negligible reflection of electromagnetic energy over a wider range of frequencies than that of the device of Fig. 8. In the circuit $L_1$, $C_1$ represent the equivalent lumped constants of the partition 48, including aperture 49, while $L_2$ represents the series inductance introduced by reason of cavities 51, 52.

Referring to Fig. 15, a further modification is shown in which waveguides 54, 56 are substantially aligned along an axis and disposed at a 90° angle relative to one another. A partition 48 is employed intermediate to waveguides 54, 56, which, while provided with resonant aperture 49 similar to that described in connection with the device of Fig. 10, may be formed with a dumbbell-shaped aperture, such as aperture 41. At the abutting ends of waveguides 54, 56, there are arranged cavities or sections 57, 58, respectively, formed by further partitions 59, 61, including resonant apertures 62, 63, respectively. The spacing of the partitions 59, 61 from the partition 48, which is located at the abutting ends of the guides 54, 56, is preferably in the neighborhood of one-quarter of a waveguide wavelength.

The device of Fig. 15, which has an equivalent circuit as illustrated in Fig. 16, is suitable for providing a triple resonant response characteristic, similar to that discussed hereinabove in connection with Fig. 7.

The apertures 49, 62, 63 are preferably designed to have the same resonant frequency, which frequency is in the vicinity of the desired pass band. By adjusting the shape of the end apertures 62, 63, which may preferably have the same configuration, relative to the shape of the aperture 49 in partition 48, it is possible to obtain varying degrees of coupling between waveguides 54, 56. Otherwise, the operation of the device of Fig. 15 is essentially similar to that of the device of Fig. 1.

In Fig. 16 the equivalent circuit of the device includes $L_a$, $C_a$, which electrically correspond to the partition 48 of Fig. 15. By reason of the further partitions 59, 61 additional series-connected combinations $L_b$, $C_b$ are introduced, thereby yielding a triple resonant voltage standing wave ratio versus frequency response characteristic.

It is apparent that many changes could be made in the construction of the devices hereinabove described and that many apparently widely different embodiments of this invention could be made without departing from the scope thereof. For instance, the configuration and position of the resonant apertures may be varied considerably. Accordingly, it is intended that all matter contained in the above description or shown in the accompanying drawings shall be interpreted as illustrative and not in a limiting sense.

What is claimed is:

1. High frequency apparatus comprising two rectangular waveguides dimensioned to propagate electromagnetic energy in the dominant mode and substantially aligned along an axis, said waveguides having end walls, a portion of each of said end walls being in common with a portion of the other end wall, the narrow sides of one of said waveguides being parallel to the broad sides of the other of said waveguides, said common end wall portion being substantially square in outline, and means for coupling between energy propagated in the dominant $TE_{10}$ mode in each of the wave guides, said last-named means including at least one aperture in the square common end wall portion between the wave guides, said aperture being resonant at a frequency within the operating frequency range of the wave guides, the energy coupling means being asymmetrical about the two bisectors of the square end wall portion that extend parallel to the wave guide walls defining said square end wall portion, and the energy coupling means being symmetrical about at least one diagonal of the square common end wall portion.

2. Apparatus as defined in claim 1 wherein said high frequency coupling means includes a conductive probe secured to said common end wall at a point along one of the diagonals thereof and extending into at least one of said waveguides.

3. Apparatus as defined in claim 1 wherein said high frequency coupling means includes a pair of resonant apertures in the common end wall portion in the form of crossed slots, the point of intersection of the slots being positioned along a diagonal at a point to one side of the center of the substantially square common end wall portion.

4. Apparatus as defined in claim 1 wherein said high frequency coupling means includes a single resonant aperture in the common end wall portion in the form of an elongated slot lying along one of the diagonals of the substantially square common end wall portion.

5. High frequency apparatus comprising two rectangular waveguides substantially aligned along an axis and having their opposed ends substantially abutting, each of said waveguides having an expanded wall portion at said ends, and partition means positioned between said expanded portions and extending across the ends of the wave guides, said partition means being substantially square in outline, the walls of one of the wave guides being disposed at right angles with respect to the corresponding walls of the other of the wave guides, and means for coupling high frequency energy from one of said wave guides to the other wave guide and exciting in said other wave guide a transversely polarized wave, the plane of polarization being perpendicular to the plane of polarization of transversely polarized energy in said one wave guide, said coupling means including at least one aperture in the partition means, the aperture being resonant at a frequency within the operating frequency range of the wave guides, said coupling means being asymmetrical about the two bisectors of said substantially square partition means that extend parallel to the wave guide walls defining the square outline of the partition means and said coupling means being symmetrical about at least one diagonal of said partition means.

6. Apparatus as in claim 5 wherein the height of said expanded portion is less than the width of said waveguides.

7. High frequency apparatus comprising two rectangular waveguides having their longitudinal axes substantially aligned, one of said waveguides being disposed at an angle relative to the other, partition means disposed between the adjacent ends of the waveguides, the partition means having a pair of crossed slots, the slots being resonant at a frequency within the operating frequency range of the waveguides, and a probe secured to the partition means and projecting into one of the waveguides, the probe being positioned intermediate adjacent ends of the pair of slots, whereby the probe produces a perturbation in symmetry.

8. High frequency apparatus comprising two rectangular waveguides having their longitudinal axes aligned and having adjacent ends, the walls of one of the waveguides being disposed perpendicularly with respect to the corresponding walls of the other of the waveguides, partition means positioned between and extending across the adjacent ends of the waveguides, the partition means having a coupling aperture including a pair of crossed slots, the slots being resonant at a frequency within the operating frequency range of the waveguides, symmetrical about a point where the collinear longitudinal axes of the waveguides intersect the partition means, and parallel to the walls of the waveguides in a plane perpendicular to the longitudinal axes of the waveguides, and a probe secured to the partition means and projecting into one of the waveguides, the probe being positioned intermediate a pair of adjacent ends of the slots, whereby the probe produces a perturbation in symmetry.

References Cited in the file of this patent

UNITED STATES PATENTS

| | | |
|---|---|---|
| 2,257,783 | Bowen | Oct. 7, 1941 |
| 2,441,598 | Robertson | May 18, 1948 |
| 2,479,650 | Tiley | Aug. 23, 1949 |
| 2,505,534 | Fiske | Apr. 25, 1950 |
| 2,514,679 | Southworth | July 11, 1950 |
| 2,540,839 | Southworth | Feb. 6, 1951 |
| 2,597,607 | Alford | May 20, 1952 |
| 2,610,249 | Fiske | Sept. 9, 1952 |

FOREIGN PATENTS

| | | |
|---|---|---|
| 592,224 | Great Britain | Sept. 11, 1947 |